United States Patent
Benco et al.

(10) Patent No.: US 7,653,046 B2
(45) Date of Patent: Jan. 26, 2010

(54) METHOD AND APPARATUS FOR PROVIDING MULTIPLE SIMULTANEOUS VOIP CALL SESSIONS FOR A SINGLE DIRECTORY NUMBER

(75) Inventors: David S. Benco, Winfield, IL (US);
Kevin J. Overend, Elmhurst, IL (US);
Baoling S. Sheen, Naperville, IL (US);
Sandra Lynn True, St. Charles, IL (US);
Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1131 days.

(21) Appl. No.: 11/013,732

(22) Filed: Dec. 16, 2004

(65) Prior Publication Data
US 2006/0133345 A1 Jun. 22, 2006

(51) Int. Cl.
*H04L 12/66* (2006.01)
(52) U.S. Cl. .................. 370/352; 370/355; 379/201.02; 379/221.02; 455/466
(58) Field of Classification Search ............... 370/352, 370/401, 355; 379/114.01, 201.12, 211.01, 379/265.04, 265.11, 265.12, 201.02, 221.02; 709/204, 218, 223, 245; 455/466
See application file for complete search history.

(56) References Cited

U.S. PATENT DOCUMENTS

| | | | |
|---|---|---|---|
| 5,206,903 A * | 4/1993 | Kohler et al. | 379/265.12 |
| 6,049,602 A * | 4/2000 | Foladare et al. | 379/265.04 |
| 6,412,014 B1 * | 6/2002 | Ryan | 709/245 |
| 6,430,176 B1 * | 8/2002 | Christie, IV | 370/355 |
| 6,678,265 B1 * | 1/2004 | Kung et al. | 370/352 |
| 6,885,872 B2 * | 4/2005 | McCann et al. | 455/466 |
| 7,035,390 B2 * | 4/2006 | Elliott | 379/201.02 |
| 7,203,186 B1 * | 4/2007 | Fuller et al. | 370/352 |
| 7,218,722 B1 * | 5/2007 | Turner et al. | 379/221.02 |
| 7,221,753 B2 * | 5/2007 | Hutton et al. | 379/265.11 |
| 7,343,397 B2 * | 3/2008 | Kochanski | 709/218 |
| 7,391,858 B1 * | 6/2008 | Ho | 379/211.01 |
| 7,437,444 B2 * | 10/2008 | Houri | 709/223 |
| 7,474,665 B2 * | 1/2009 | Cho | 370/401 |
| 2002/0194272 A1 * | 12/2002 | Zhu | 709/204 |
| 2003/0235182 A1 | 12/2003 | McMillin | |
| 2004/0190711 A1 | 9/2004 | Miyajima | |
| 2004/0202302 A1 * | 10/2004 | Richards | 379/201.12 |
| 2004/0213392 A1 * | 10/2004 | Crockett et al. | 379/114.01 |
| 2005/0117568 A1 * | 6/2005 | Kitazawa | 370/352 |
| 2006/0098583 A1 * | 5/2006 | Baker et al. | 370/252 |

FOREIGN PATENT DOCUMENTS

EP 1 313 288 A2 5/2003
WO WO 99/67922 12/1999

* cited by examiner

*Primary Examiner*—Gerald Gauthier
(74) *Attorney, Agent, or Firm*—Fay Sharpe, LLP

(57) ABSTRACT

A system and method for providing a plurality of separate Voice Over Internet Protocol (VOIP) call sessions for a single Directory Number (DN). The method includes associating a plurality of IP addresses with a single DN, communicating the association to a Switching Center responsible for routing calls between the DN and the Public Switched Telephone Network (PSTN), determining that an existing VOIP call session associated with the DN is in progress, and creating another separate simultaneous VOIP call session for the DN. A communications system includes a switching center receiving an association between a plurality of IP addresses and a single DN for providing a plurality of separate simultaneous VOIP call sessions for the DN.

14 Claims, 4 Drawing Sheets

METHOD AND APPARATUS FOR PROVIDING MULTIPLE SIMULTANEOUS VOIP CALL SESSIONS FOR A SINGLE DIRECTORY NUMBER

BACKGROUND OF THE INVENTION

This invention relates to a method and apparatus for Voice over Internet Protocol (VOIP) communications, and more particularly creating multiple VOIP call sessions for a single directory number. While the invention is particularly directed to the art of VOIP, and will be thus described with specific reference thereto, it will be appreciated that the invention may have usefulness in other fields and applications.

A Directory Number (DN) is a telephone number, an example of which can include a phone number from the North American Numbering Plan (NANP), among others, which identifies a terminal, such as a cell phone, softphone, etc., or a location in the case of conventional Plain Old Telephone Services (POTS) telephones, for routing calls to and from the terminal/location over the Public Switched Telephone Network (PSTN). When a calling party attempts to communicate with a called party, the calling party dials the called party DN and the call is routed from the calling party terminal to the called party terminal using called party DN. The calling party DN is also used during the call to establish a return route back to the calling party terminal thereby providing a duplex call session giving simultaneous two-way communication between the two terminals.

VOIP calling uses Internet Protocol (IP) addressing schemes to provide packet switched voice communications over a packet data network such as the Internet. Rather than establishing a physical connection between the two terminals as is done with Plain Old Telephone Switched (POTS) circuit-switched calls, or using specialized packet-switched networks as is done in ATM and others, VOIP uses an IP address for routing packet-based information to and from a VOIP terminal over the Internet to provide voice communications referred to as a call.

In order to communicate with terminals over the PSTN, a VOIP terminal IP address is associated with a DN and the conversion between the two is made in the communications network. Currently, each DN capable of providing a VOIP call session via a VOIP terminal has one IP address associated with it at the communications network level. As a result, only one VOIP call session is allowed for each DN by the communications network. If the DN is in use by a VOIP terminal engaged in a VOIP call session, then a "busy" signal is created and sent back to another calling party who tries to call the VOIP terminal using the DN.

If several VOIP terminals are associated with a single DN, similar to having several land line telephones connected to the same phone line, a local router is used to connect the VOIP terminals with the IP network. The DN is then associated with the IP address of the local router. Again, only one VOIP call session at a time is allowed by the communications network for the DN associated with the router's IP address. Even though multiple parties may be bridged together by the network to simultaneously communicate with the VOIP terminal, this still only constitutes a single call session for the DN. As a result, while one VOIP terminal in this configuration is used in a call session, another call cannot be made or received simultaneously on one of the other VOIP terminals connected to the local router associated with the same DN.

The present invention contemplates a new and improved system and method that resolves the above-referenced difficulties and others.

SUMMARY OF THE INVENTION

A method and apparatus for multiple simultaneous VOIP call sessions for a single DN are provided.

In one aspect of the invention the method includes associating a plurality of IP addresses with a single DN, communicating the association to a Switching Center responsible for routing calls between the DN and the PSTN, determining that an existing VOIP call session associated with the DN is in progress, and creating another separate simultaneous VOIP call session for the DN.

In another aspect of the invention, a communications system includes a switching center receiving an association between a plurality of IP addresses and a single DN for providing a plurality of separate simultaneous VOIP call sessions for the DN.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
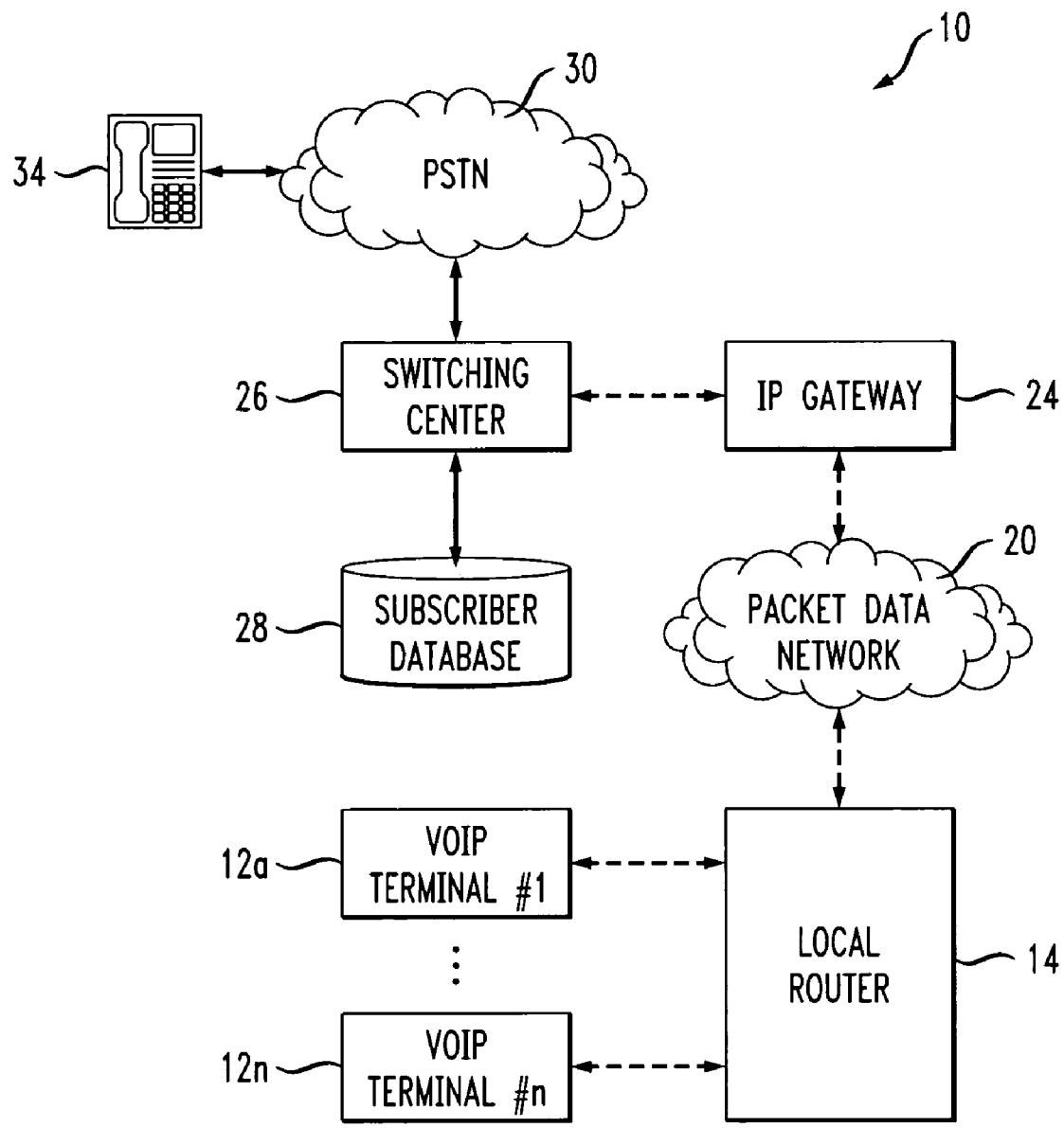
FIG. 1 is a block diagram illustrating a communications network including a system for practicing aspects of the present inventive subject matter.

Referring now to the drawings wherein the showings are for purposes of illustrating the preferred embodiments of the invention only and not for purposes of limiting same, FIG. 1 provides a view of the overall preferred system according to the present invention.

As shown in FIG. 1, a communications network for providing VOIP calling is shown generally at 10. The system 10 includes a plurality of VOIP terminals 12a-12n, referred collectively as VOIP terminals 12, connected to a router 14 via typical network connections. Examples of the VOIP terminals 12 can include, but are not limited to, a softphone running as an application on a computer, or a hardphone for providing voice communications using VOIP. Each VOIP terminal 12a-12n has a unique address, such as an IP address, for communicating over a packet data network.

The communications network 10 also includes a packet data network 20, such as for example the Internet, for providing the transmission of packet-based information using Internet Protocol (IP) The local router 14 is connected to the packet data network 20 for routing VOIP calls between the VOIP terminals 12a-12n and the packet data network and ultimately the PSTN as described below.

The communications network 10 also includes an IP gateway 24, also known as a Media Gateway, for converting and/or translating IP based packet-switched calls into circuit switched calls and vice versa depending on the direction of traffic flow. That is to say, the IP gateway 24 operatively connects the packet data network 20 with the circuit switched Public Switched Telephone Network (PSTN) 30. By way of example, a suitable IP gateway 24 can include an iMerge® gateway provided by Lucent Technologies.

A Switching Center 26 is connected to the PSTN 30 for routing call traffic made by the VOIP terminals 12a-12n to the PSTN and for routing call traffic from the PSTN destined for, that is made to, the VOIP terminals. The Switching Center 26 uses protocols, including but not limited to H.323 protocols among others, for routing these calls to and from the PSTN 30 using the DNs. The Switching Center 26 handles call set-ups for associated terminals, as well as providing services for these terminals, including voice mail and others, which can be made available via subscription. The switching center 26 can also be a Mobile Switching Center (MSC) for also connecting mobile phones with the PSTN 30.

The Switching Center 26 is connected to a Subscriber Database 28 having subscriber information for the terminals associated with it. A subscriber identifier, such as a DN, can be used to identify the subscriber for associating the calling services ascribed to the subscriber. The subscriber database 28 can be located at the Switching Center 26, or these two elements can be connected in a known manner, for quick and reliable communication therebetween.

Figure 2:
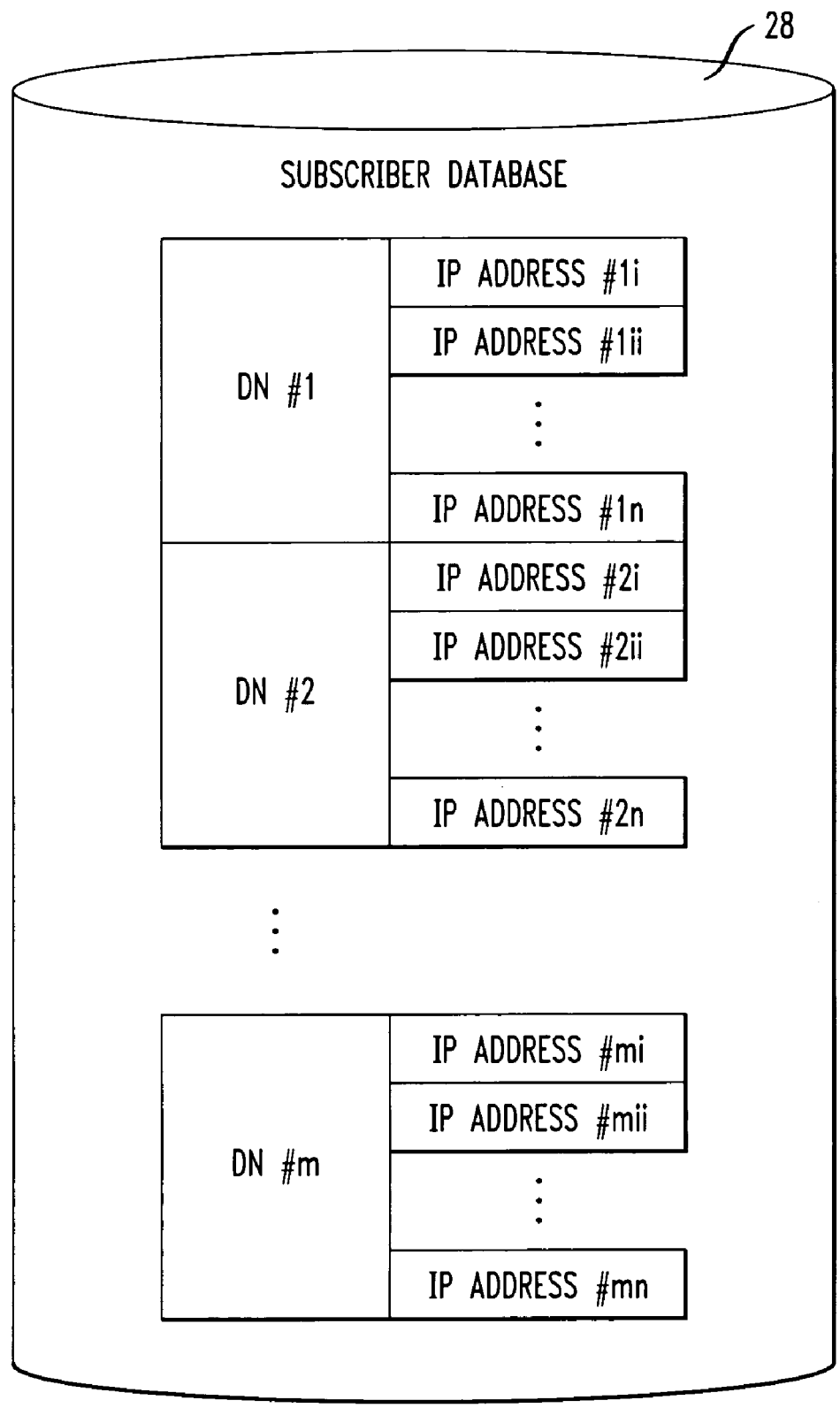
FIG. 2 is a block diagram illustrating an association of a DN with a plurality of IP addresses communicated to a Switching Center for practicing aspects of the present inventive subject matter.

Referring to FIG. 2, the subscriber database 28 includes a plurality of DNs, up to DN #m, where m can be any number. The subscriber database 28 is shown providing an association between a subscriber's DN, such as DN #1, and a plurality of different IP addresses. This association can be made using a look-up table as shown, or in another suitable manner. Each separate VOIP terminal IP address that can be reached by calling the DN is associated with the DN in this database. For the purposes of illustrating this association, the different IP addresses associated with DN #1 are shown as IP address #1i, IP address #1ii, etc. through IP address #1n, in which n can be any number. Each separate IP address, i, ii, iii, to n, is the IP address of a separate VOIP terminal 12, 12a, 12b, 12c, to 12n respectively. However, all of these VOIP terminals 12a-12n have the same DN for communicating with the PSTN 30.

Providing this association information to the Switching Center 26 enables the Switching Center to create plurality of separate, simultaneous call sessions to/from VOIP terminals 12 all having a single DN. As a result, the invention provides for a multi-call feature which enables multiple separate simultaneous VOIP call sessions, also known as VOIP channels, to be created for one DN. Each call session provides duplex voice communications between both the calling party and the called party, one of which is at least one of the VOIP terminals 12a-12n. Each separate duplex session enables 2-way communication between both parties of the session, providing similar results as a conventional duplex circuit-switched call session. These separate VOIP call sessions can take place simultaneously, though they can be created at different times as different calls are made to and/or from the VOIP terminals 12.

Figure 3:
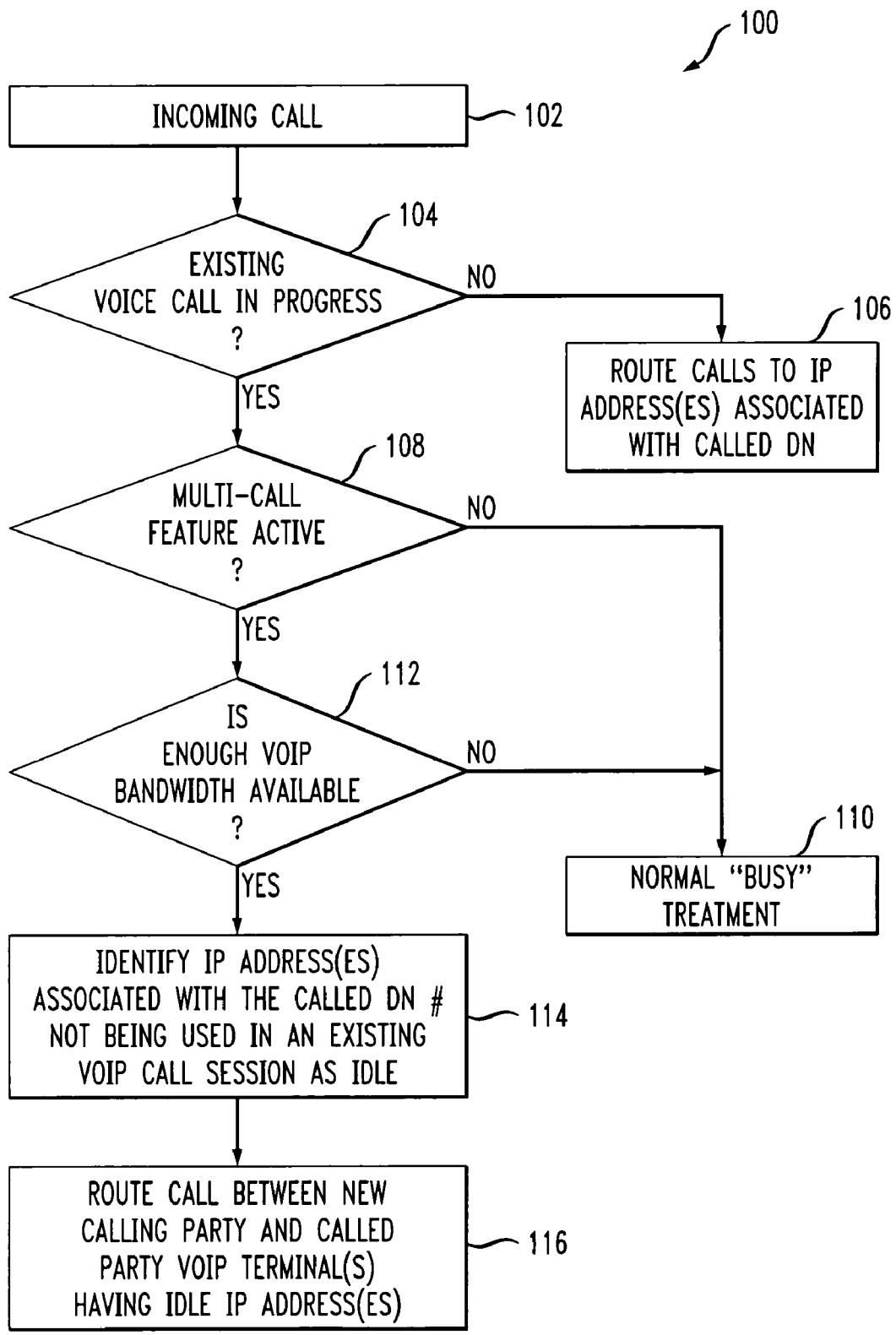
FIG. 3 is a flow chart illustrating a method in accordance with the present invention.

Referring now to FIG. 3, a method of operation of the VOIP multi-call feature, is shown generally at 100, for an incoming call made by a calling party 34 to the DN, such as DN #1, of the called party VOIP terminals 12. Each VOIP terminal 12a-12n has a separate IP address, shown as IP address #1i-IP address #1n respectively. These IP addresses are all associated with the same DN at the subscriber database 28 as described above. The calling party 34 dials DN #1 of the VOIP terminals 12, and the call, referred to as an incoming call, is routed over the PSTN 30 to the Switching Center 26 responsible for handling calls to/from the VOIP terminals 12 at 102. The Switching Center determines whether an existing voice call session is in progress for the DN #1 in the usual manner at 104. If no existing call is in progress, the Switching Center 26 routes the call to the IP address or addresses, in this example IP addresses #1i-#1n, of the VOIP terminals 12 associated with the called DN at 106.

If an existing call session for the called DN is in progress, the Switching Center queries the Subscriber Database 28 to determine if the called DN # subscribes to the VOIP multi-call feature of the invention at 108. If not, the Switching Center provides a busy signal to the calling party 34 in the usual manner at 110. If the multi-call feature is available for the called DN #, the Switching Center can determine if enough VOIP bandwidth is available for the VOIP addresses associated with the called DN #1. Available bandwidth determinations can be made in the usual manner, such as is described in U.S. Pat. No. 6,778,496 B1 to Meempat et al. Lucent Technologies, which is hereby incorporated by reference herein. If enough VOIP bandwidth is not available, the Switching Center provides a busy signal to the calling party 34 in the usual manner at 110. It should be appreciated that the steps of determining if enough VOIP bandwidth is available at 112 and if not, providing a busy signal at 110, can be optional.

If it is found in the optional step 112 that enough VOIP bandwidth is available, the Switching Center 26 identifies the other IP address or addresses associated with the called DN that are not being used in an existing VOIP call session as idle IP addresses at 114. The Switching Center 26 then routes the call to the called party VOIP terminal or terminals having these idle IP addresses over the packet data network 20. In this manner, the Switching Center creates another, separate VOIP session for these VOIP terminals associated with the called DN. These steps 102-116 can be repeated for more new incoming calls. When a call session involving one or more of the VOIP terminals 12 is terminated, the Switching Center 26 can identify the respective IP address or addresses as idle.

Figure 4:
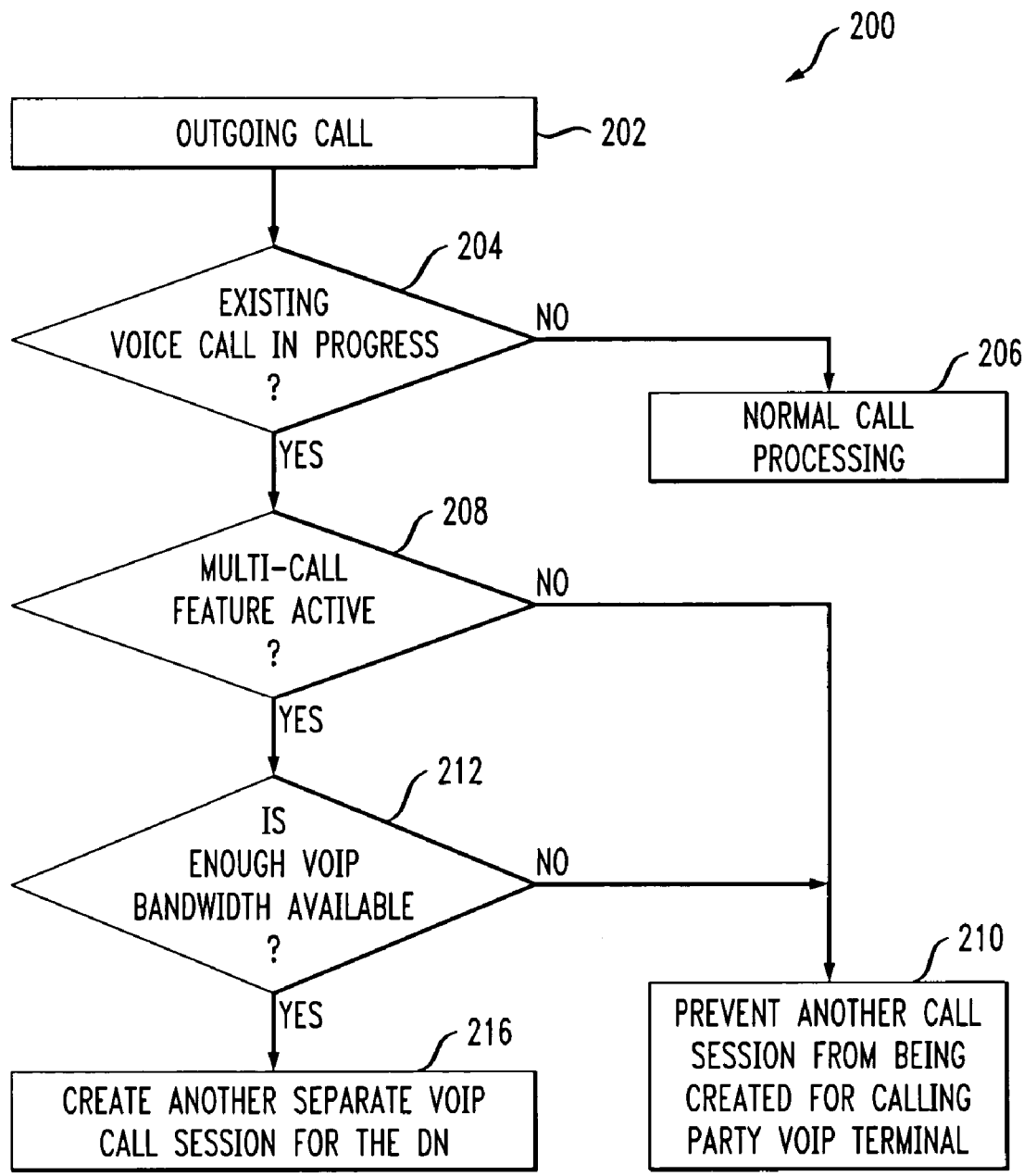
FIG. 4 is a flow chart illustrating a method in accordance with the present invention.

Referring now to FIG. 4, a method of operation of the VOIP multi-call feature, is shown generally at 100, for an outgoing call made by one of the VOIP terminals 12, now referred to as a calling party, to a called party 34. The calling party VOIP terminal has a separate IP address, which is associated with the DN as described above. The calling party VOIP terminal 12 dials the DN of the called party 34 and the call, referred to as an outgoing call, is routed to the Switching Center 26 responsible for handling calls to/from the VOIP terminals 12 over the packet data network 20 at 202. The Switching Center determines whether an existing voice call session Is in progress for the DN #1 in the usual manner at 204. If no existing call is in progress, the Switching Center routes the call to the called party 34 at 106.

If an existing call session for the calling party DN is in progress, the Switching Center queries the Subscriber Database 28 to determine if the calling party DN #1 subscribes to the VOIP multi-call feature of the invention at 208. If not, the Switching Center prevents another simultaneous call session from being created for the calling party VOIP terminal 12 at 210.

If the multi-call feature is available for the calling party DN #, the Switching Center can determine if enough VOIP bandwidth is available at 212, as described above, and if not, prevent another simultaneous call session from being created for the calling party VOIP terminal 12 at 210. Again, it should be appreciated that the steps of determining if enough VOIP bandwidth is available at 212 and if not, preventing multiple call sessions from being created, at 210, can be optional.

If it is found in the optional step 212 that enough VOIP bandwidth is available, the Switching Center 26 creates another separate VOIP call session for the DN at 216. The Switching Center 26 then routes the call to the called party 34 providing the PSTN 30 with the DN for the VOIP terminal making the call. These steps 202-216 can be repeated for more outgoing calls.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for providing a plurality of separate Voice Over Internet Protocol (VOIP) call sessions for a single North American Numbering Plan (NANP) Directory Number (DN) comprising:
   associating a plurality of IP addresses with a single NANP DN in a lookup table, wherein each IP address corresponds to a different VOIP terminal and all of the VOIP terminals having the same DN for communicating with the PSTN;
   a switching center receiving an incoming call from a calling party calling to the NANP DN;
   the switching center determining that an existing VOIP call session associated with the NANP DN is in progress;
   the switching center identifying another IP address associated with the NANP DN in the lookup table not being used in an existing VOIP call session as an idle IP address;
   routing the incoming call over an IP network between the calling party and a called party VOIP terminal having the idle IP address.

2. The method defined in claim 1 wherein the identifying step includes identifying a plurality of IP addresses associated with the NANP DN not being used in an existing VOIP call session as idle IP addresses and the routing step includes routing the incoming call between the calling party and a plurality of called party VOIP terminals having the idle IP addresses.

3. The method defined in claim 1 wherein the lookup table is in a subscriber database.

4. The method defined in claim 1 further comprising:
   terminating the call session between the calling party and called party VOIP terminal;
   identifying the IP address associated with the called party VOIP terminal of the terminated call session as an idle IP.

5. The method defined in claim 1 further comprising the switching center determining if the NANP DN can be used for a plurality of separate simultaneous VOIP call sessions.

6. The method defined in claim 5 wherein the step of determining if the NANP DN can be used for a plurality of separate simultaneous VOIP call sessions comprises determining if the NANP DN owner has subscribed to a VOIP multi-call feature.

7. The method defined in claim 6 further comprising querying a subscriber database to determine if the NANP DN owner has subscribed to the VOIP multi-call feature.

8. A method for providing a plurality of separate Voice Over Internet Protocol (VOIP) call sessions for a single North American Numbering Plan (NANP) Directory Number (DN) comprising:
   associating a plurality of IP addresses with a single NANP DN in a lookup table, wherein each IP address corresponds to a different VOIP terminal and all of the VOIP terminals having the same NANP DN for communicating with the PSTN;
   communicating the association to a Switching Center responsible for routing calls between the NANP DN and the Public Switched Telephone Network (PSTN);
   determining that an existing VOIP call session associated with the NANP DN is in progress; and
   creating another separate simultaneous VOIP call session for the NANP DN.

9. The method defined in claim 8 wherein the creating step includes creating a VOIP call session between a calling party VOIP terminal associated with the NANP DN and a called party.

10. The method defined in claim 8 wherein the lookup table is in a subscriber database.

11. The method defined in claim 8 further comprising:
    determining if the NANP DN can be used for a plurality of separate simultaneous VOIP call sessions.

12. The method defined in claim 11 wherein the step of determining if the NANP DN can be used for a plurality of separate VOIP call sessions comprises determining if the NANP DN owner has subscribed to a VOIP multi-call feature.

13. The method defined in claim 12 further comprising querying the subscriber database to determine if the NANP DN owner has subscribed to the VOIP multi-call feature.

14. A communications system for providing a plurality of separate Voice Over Internet Protocol (VOIP) call sessions for a single North American Numbefinci Plan (NANP) Directory Number (DN) comprising:
    a database having a plurality of IP addresses associated with a single NANP DN, wherein each IP address corresponds to a different VOIP terminal and all of the VOIP terminals having the same NANP DN for communicating with the PSTN; and
    a Switching Center responsible for routing calls between the DN and the Public Switched Telephone Network (PSTN) communicating with the database for establishing a plurality of separate simultaneous VOIP call sessions for the NANP DN.

* * * * *

UNITED STATES PATENT AND TRADEMARK OFFICE
CERTIFICATE OF CORRECTION

| | | |
|---|---|---|
| PATENT NO. | : 7,653,046 B2 | Page 1 of 1 |
| APPLICATION NO. | : 11/013732 | |
| DATED | : January 26, 2010 | |
| INVENTOR(S) | : Benco et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1440 days.

Signed and Sealed this

Twenty-eighth Day of December, 2010

David J. Kappos
*Director of the United States Patent and Trademark Office*